United States Patent [19]

Curl et al.

[11] 4,172,516
[45] Oct. 30, 1979

[54] CROP DISCHARGE CONVEYOR ASSEMBLY

[76] Inventors: Robert B. Curl, 1960 Floral Ave., P.O. Box 562; Fred Foss, 359 Taylor, both of Twin Falls, Id. 83301

[21] Appl. No.: 769,522

[22] Filed: Feb. 17, 1977

[51] Int. Cl.² .............................................. B65G 29/00
[52] U.S. Cl. .................................. 198/608; 198/611; 198/688
[58] Field of Search .................. 198/688, 608, 611; 209/84, 104, 75

[56] References Cited

U.S. PATENT DOCUMENTS

| | | | |
|---|---|---|---|
| 1,679,593 | 8/1928 | Williamson et al. | 209/104 |
| 2,718,960 | 9/1955 | Standal | 198/608 |
| 3,390,768 | 7/1968 | Button | 209/84 |
| 3,679,050 | 7/1972 | Anderson et al. | 198/688 |
| 3,985,233 | 10/1976 | Sherman | 209/104 |

*Primary Examiner*—Allen N. Knowles
*Attorney, Agent, or Firm*—Trask & Britt

[57] ABSTRACT

A crop conveyor assembly having regularly spaced flights and discharge means to minimize bruising is disclosed. A crop conveyor having a feed section and a discharge end is equipped with regularly spaced flights wherein said flights have upright, regularly spaced, flexible fingers. Discharge means to minimize crop bruising is located adjacent the discharge end of the conveyor. The discharge means comprises slender, spaced members through which the fingers of the flight pass as the conveyor changes direction at the discharge of said conveyor. Disk members attached to a common axle perform well as the discharge means.

8 Claims, 9 Drawing Figures

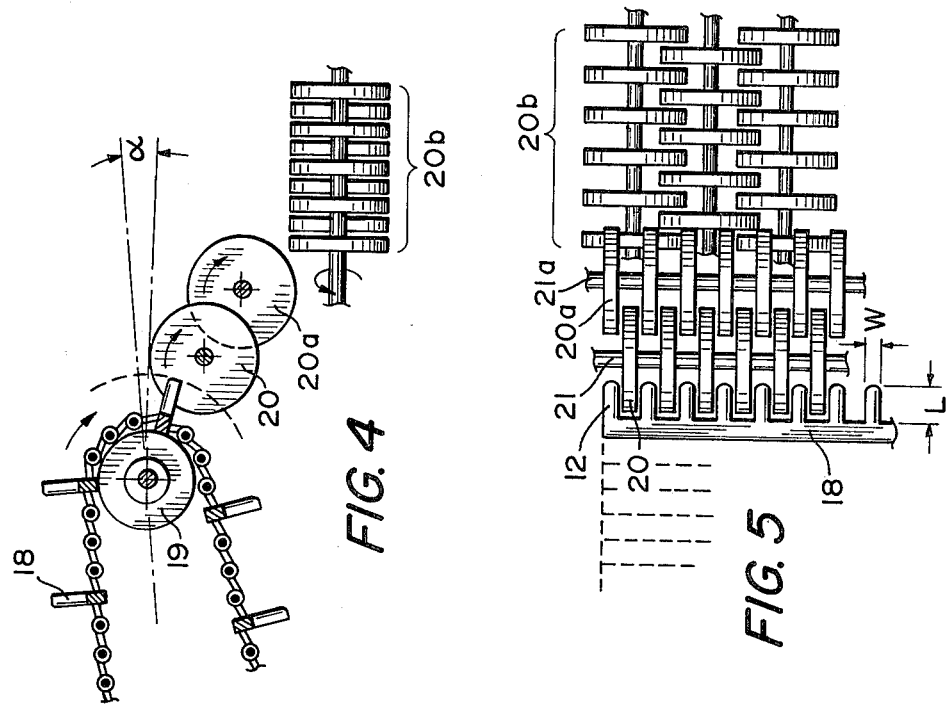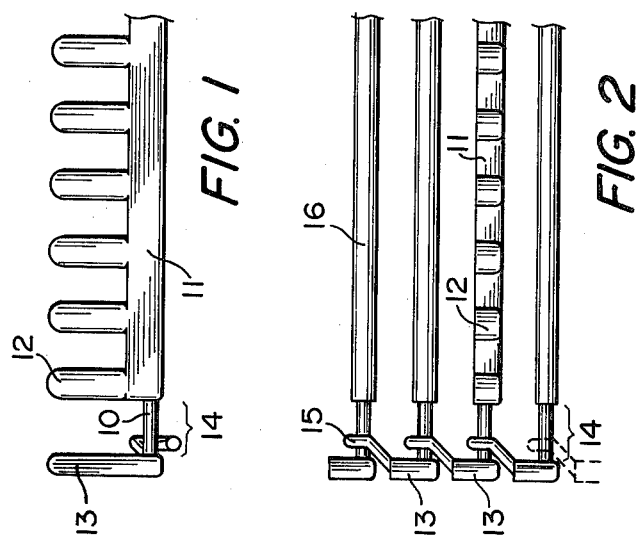

PRIOR ART ROLLER CONVEYOR

CROP DISCHARGE CONVEYOR ASSEMBLY

BACKGROUND OF INVENTION

1. Field

The invention relates to flight conveyors for moving easily bruised crops such as potatoes, apples, peaches, tomatoes and the like, and especially to discharge conveyors whereby the crops are discharged from a harvesting or similar processing machine to a bulk transport means.

2. Prior Art

Conveyors with solid transverse flights of rubber or other composition, particularly solid flights attached to rubber conveyor belts and the like, have been known in the art. Also, it is known in the art to place small fingers upright on a rubber belt for transporting the crops on top the fingers. U.S. Pat. No. 2,769,534 depicts this.

In U.S. Pat. No. 3,679,050 to Anderson et al a conveyor structure is disclosed wherein individual link members have relatively tall, slender fingers extending substantially vertically from the link member and staggered on alternate links to receive potatoes and to hold the potatoes between said fingers to prevent the potatoes from rolling and becoming bruised. The fingers are spaced so that the potatoes will be received between the fingers. Each link of the conveyor has fingers thereon and the fingers of one link are offset substantially in the middle of the space between fingers of adjacent links.

OBJECTS OF THE INVENTION

It is an object of the instant invention to provide a conveyor having regularly spaced flights which cooperate with discharge means to minimize bruising of the crops conveyed.

Another object of the instant invention is to provide a link-type conveyor with flights wherein each link with a flight thereon is substantially identical to every other link.

A further object of the instant invention is to provide an open link-type conveyor having end means on the links to prevent potatoes from rolling off the side of the conveyor.

A still further object of the instant invention is to provide a link with a flight attached to transport easily bruised crops without bruising same.

DESCRIPTION OF THE DRAWINGS

FIG. 1 is an elevational view of a conveyor link with a rake-type flight;

FIG. 2 is a plan view of the link of FIG. 1 interconnected with conventional rubber encased links;

FIG. 3 is an elevational end view of the link of FIG. 1;

FIG. 4 is an elevational view of a rake-flight conveyor discharge end interacting with disk-type discharge means and a disk-type conveyor table;

FIG. 5 is a plan view of the rake-flight conveyor and the disk-type discharge means and conveyor of FIG. 4;

DESCRIPTION OF INVENTION

Figure 8:
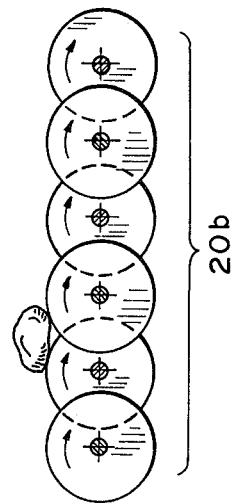
FIG. 8 is an elevational view of a disk-type table conveyor.

A crop conveyor assembly having regularly spaced flights and discharge means wherein said flights minimize crop bruising has been invented. The crop conveyor has a feed section and a discharge end. The conveyor is equipped with regularly spaced flights wherein said flights have upright, regularly spaced flexible fingers. A web of the same material preferably interconnects said fingers and encases the metal conveyor bar which with similar bars forms an open link conveyor. At the discharge end of the conveyor there is provided a discharge means which cooperates with said flights to minimize crop bruising. The discharge means comprises slender, spaced members through which the fingers of the flight pass as the conveyor changes direction at the discharge end of the conveyor. Disk members attached to a common axle perform well as the discharge means.

Further description of the instant invention may be facilitated by reference to the attached drawings.

The conveyor link of this invention is illustrated in FIG. 1 which is an elevational view of the link showing the link member 10 covered with a flexible material, such as a flexible rubber, plastic or the like to form a body 11 covering the link member with regularly spaced fingers 12 projecting from the resilient body a distance of about 1 to about 3 inches depending upon the thickness of the body 11 and preferably from about 1½ to about 2 inches. At the end of the link is a wing member 13 which is preferably about the same height as fingers 12 and has a significant fore-aft length, as illustrated in FIG. 2. The link member 10 is exposed between the wing member 13 and the end of body 11 to provide a bearing surface 14 to be engaged by the hook portion of a trailing link. While the fingers are flexible and will bend slightly under load, they are sufficiently rigid to hold crops in place even when the conveyor is placed at a sharp incline.

The manner in which one link engages another is illustrated in FIG. 2. A link equipped with a flight member is illustrated with the wing member 13 and a body 11 with fingers 12 extending therefrom. The hook portion 15 of a trailing link is shown engaging a bearing surface 14 of the flight equipped link. Typically, one flight link is placed in the conveyor at about every third link, that is, there are about two normal links between each flight equipped link. The normal links are usually covered with a body of a flexible resilient rubber or plastic material 16 and may, if desired, have a wing member 13 on the end of the link to provide means for retaining crops on the link. The distance between the center of one link to the center of an adjacent link is generally from about 1½ to about 3 inches and preferably about 1¾ to about 2½ inches. Spacing between links may be affected by a coating on the link to form a body. The coated links are generally closer together, although use of uncoated links is generally not desired for use with crops that are easily bruised. The coating on the link is generally a resilient, flexible rubber or plastic material, about ⅛ inch to about ½ inch in thickness and preferably about ¼ inch in thickness. The open space between links is generally from about ½ inch to about 1 inch and preferably does not exceed 1 inch.

FIG. 3 illustrates an elevational, end-on view of the link conveyor showing the wing member 13 and its fore-aft extension. The fore-aft length of a wing member depends upon the length of the hook member. A typical hook extends about 2 to 3 inches from the straight section of the link. A wing member should generally be about 1 inch to about 1½ inches in length and the preferred length being about 1½ inches. The wing member may extend from the rear of the straight section of the link to a forward distance sufficiently short of the bight 17 of the hook so that it does not interfere with engaging of the hook member with the bearing section of the next forward adjacent link. The wing member assists in preventing any portion of the crop being conveyed from tumbling off the side of the conveyor.

The cooperation of the rake-flight members of the invention with discharge assist means is illustrated in FIG. 4 wherein the flight members 18 pass about a discharge sprocket 19 and the fingers of the flight members pass through disks member 20. The disk member preferably has a diameter of at least twice the length of the fingers of the flight member. The disks are placed on a common axle 21 and are spaced at sufficient distance from the conveyor so that the fingers of the flight members clear the axle 21. The disks are further placed with reference to the conveyor so that the uppermost surface of the disks forms an angle (alpha) with the center line of the conveyor passing through the axle of the discharge pulley 19. The angle (alpha) may be from about 0 to 45° and preferably from about 10° to about 30°. The diameter of the disk members is generally from about 4 to about 8 inches.

The crop, typically potatoes, passes along the conveyor with the help of flights 18. As the potatoes pass over the sprocket 19 the potatoes do not drop, but roll or tumble over disks 20, and optionally a second set of spaced, parallel disks 20a which intermesh with the disks 20, onto a roller table, or preferably, as illustrated, a table of intermeshing disks 20b. It is important in harvesting a crop such as potatoes to minimize bruising and skinning. Minimal bruising and skinning permits the conveyors to be operated faster, thus speeding up harvesting which is important considering that the harvesting season for potatoes is only about six weeks in length. Faster harvesting permits harvesting of more potatoes with fewer harvesting machines.

The conveyor of FIGS. 4 and 5 may be operated at a high velocity. The flights 18 carry the potatoes with a minimum of jostling and rolling. As the potatoes are discharged, the passing of the fingers 12 through the spaces between disks 20 allows the first row of disks to be close to the conveyor. Thus, any whipping action caused by flights is minimized. Also, the disks 20 and 20a are preferably rotated in the direction of movement of the potatoes. The flow of potatoes along the flighted conveyor and onto the disk table 20b is smooth.

The cooperation of the rake-flight members of the invention with discharge assist means is illustrated in FIG. 4 wherein the flight members 18 pass about a discharge sprocket 19 and the fingers 12 of the flight members pass through disk member 20. The disk member preferably has a diameter of at least twice the length of the fingers of the flight member.

A plan view of the engagement of the fingers of the flight 18 with the disk members is illustrated in FIG. 5. The fingers 12 are shown passing between the regularly spaced disks 20 and clearing axle 21. As previously stated, the length (L) of the fingers is generally from about 1 to about 3 inches and preferably from about 1½ to about 2 inches, while the width (W) is from about ½ inch to about 1 inch, and preferably from about ⅝ inch. The thickness (T) of the fingers is generally from about ½ inch to about ¾ inch and preferably about ⅝ inch. The disks may be stationary or may be rotated in the same direction as the travel of the conveyor. If the disks are rotated the rotational speed preferably approximates the rotational speed of pulley 19.

The flow of potatoes from flight 18 is over disks 20 and disks 20a onto the disk table 20b. The disk table 20b comprises a series of spaced axles, each axle with axially spaced disks thereon. The disks of one axle meshing with the disks of adjacent axles. The axles are spaced at a distance slightly greater than the radii of the disks and the spacing between disks is slightly greater than the disk thickness. Thus, space is allowed for dirt to drop through. The disks on table 20b are rotated to move the potatoes in the desired direction.

Figure 6:
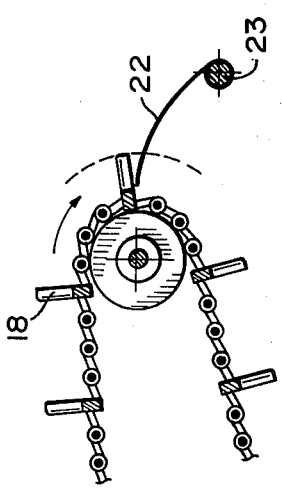
FIG. 6 is an elevational view of a rake-flight conveyor and leaf type discharge means.
Figure 7:
FIG. 7 is a plan view of the rake-flight conveyor and discharge means of FIG. 6.

In FIG. 6 a slightly different embodiment of the invention is shown wherein the flights 18 mesh with spring-type finger members 22 which are attached to a shaft 23 and form a curved surface with the end of the member 22 sufficiently short of the end of the conveyor so that the finger members of flight 18 pass through the strap members 22. In FIG. 7 a plan view of a discharge means of FIG. 6 is illustrated wherein the strap member 22 protrudes into the spaces between adjacent fingers 12 of the flight 18.

The flights are serrated rather than solid to allow flexing of fingers and to allow the fingers to pass through the discharge means. Flights assist in conveying any material up an incline. However, with easily bruised or skinned crops, flights can create a problem.

At the discharge end of a conveyor with flights, the crop being conveyed tends to whipped off the conveyor as the flights turn about the discharge sprocket. The whipping results from the increased velocity of the outer edge of the flights as the conveyor turns about the discharge sprocket. This is especially a problem on faster moving conveyors such as those used on potato harvesting machines. Since this whipping action occurs at the discharge end of the conveyor it tends to aggrevate the bruising or skinning which may occur from the crop dropping from the conveyor onto another conveyor or receiver.

Another typical problem of conveyors with flights is associated with the drop at the discharge end of the conveyor. If the dropping distance is decreased to minimize bruising and skinning of the crop, the flights tend to sweep or wipe some of the crop off the receiving conveyor, thus causing wastage.

The discharge means of this invention associated with the deeply serrated flights eliminates the whipping and wiping problems. Axially spaced disks perform particularly effectively for this purpose. One or more sets of spaced, parallel disks permit potatoes or other crops to tumble down from one conveyor to another rather than drop down. Also, the spaced disks permit the conveyor with flights to be spaced a sufficient distance from the receiving conveyor or table so that the flights do not wipe or sweep any of the crop from the receiving conveyor.

The spaced disks may be stationary or revolving in the direction of flow of material. Revolving the disks so that the upper surface of the disk is travelling in the same direction as the crop being conveyed helps minimize skinning or bruising of the crop. The peripheral speed of the revolving disks preferably closely approximates the linear speed of the conveyor.

Figure 9:
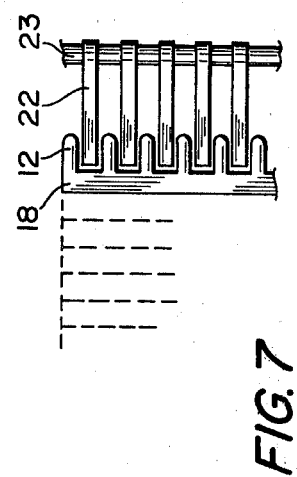
FIG. 9 is an elevational view of a conventional, prior art roller table conveyor.

The spaced, parallel disks are also useful as a flat conveyor of potatoes and produce less skinning and bruising than parallel rollers. A table conveyor of disks is illustrated in FIG. 5 as a receiving table for potatoes. Dirt easily passes between the revolving disks. The disks, being relatively thin and closely adjacent to one another allow all but the smallest potatoes to be transported by more than one disk. Usually medium size and larger potatoes are contacted by disks in adjacent rows at the same time. This provides good support while preventing the potatoes from being caught between rows and skinned by the turning of the disks as occurs with rolls. The closest surfaces or rotating rolls are travelling in different directions (see FIG. 9). Since the roll surfaces must be spaced from one another, a portion of the potatoes are small enough so that the ends of the potatoes are between adjacent roller surfaces and become skinned.

The diameter of the disks is generally greater than that of rollers of the prior art. Increasing the diameter of the rollers significantly increases the amount of material used in the rollers. Also, adjacent rollers must be spaced apart so that dirt may fall between them. Contrastingly, the disks may be larger since they are spaced laterally (axially) as well as along the direction of travel of the crop. Thus, the disk conveyor illustrated in FIGS. 5 and 8 allows dirt to fall through while maintaining the potatoes on top of the disks without any substantial skinning.

We claim:

1. A crop conveyor assembly comprising:
   (a) a continuous conveyor having a feed section and a discharge section;
   (b) conveyor flight members regularly spaced along said continuous conveyor, said flight members having upright, regularly spaced, flexible fingers;
   (c) discharge means at the conveyor discharge section to cause said conveyor to change its direction of travel at least 90°;
   (d) slender spaced discharge members through which pass the flexible fingers of said conveyor flights, said discharge members located adjacent said conveyor discharge end at a position below the upper level of said conveyor to cushion the discharge of crops from said conveyor to prevent bruising of said crops.

2. The conveyor assembly of claim 1 wherein said continuous conveyor comprises elongated interconnected links.

3. The conveyor assembly of claim 2 wherein said link members have a shock absorbing covering.

4. The conveyor assembly of claim 2 wherein said flight members are attached to a plurality of link members.

5. The conveyor assembly of claim 4 wherein said flight members are a rubbery material.

6. The conveyor assembly of claim 1 wherein said slender, spaced discharge members have a convex upper surface.

7. The conveyor assembly of claim 1 wherein said slender, spaced discharge members are disks.

8. The conveyor assembly of claim 7 wherein said disks are attached to a common axle.

* * * * *